Sept. 18, 1956   J. H. VAN CAMPEN ET AL   2,763,552
MODIFIERS FOR PHOTOGRAPHIC PACKET EMULSIONS
Filed Dec. 20, 1954
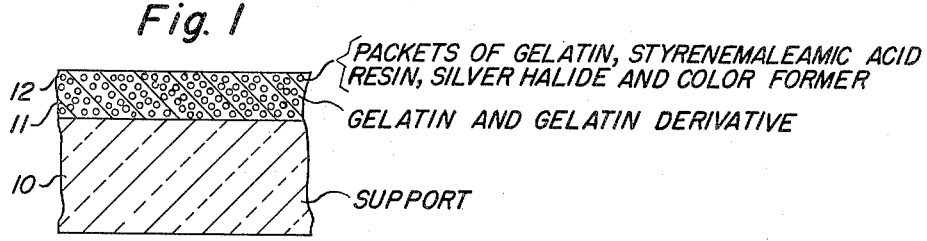
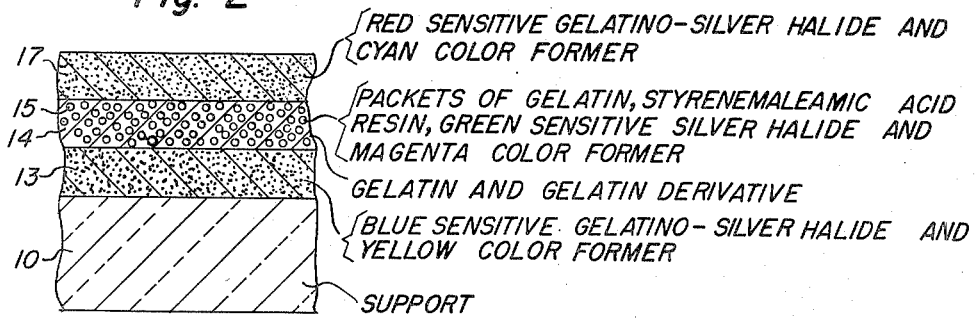
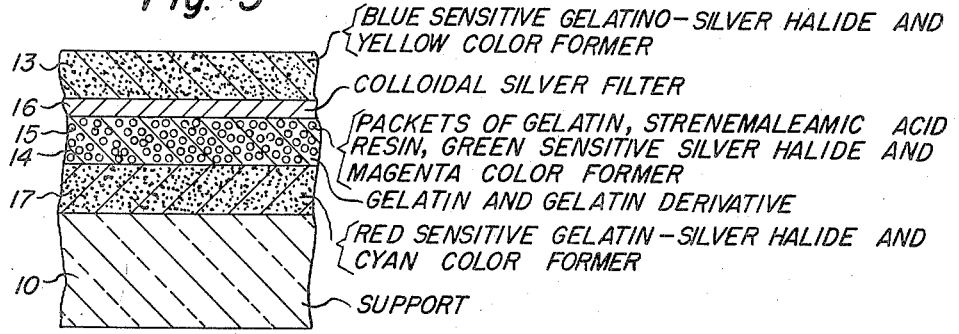
JOHN H. VAN CAMPEN
JOHN W. GATES JR.
INVENTORS
ATTORNEYS United States Patent Office 2,763,552
Patented Sept. 18, 1956

2,763,552

MODIFIERS FOR PHOTOGRAPHIC PACKET EMULSIONS

John H. Van Campen and John W. Gates, Jr., Rochester, N. Y., assignors to Eastman Kodak Company, Rochester, N. Y., a corporation of New Jersey Application December 20, 1954, Serial No. 476,240

12 Claims. (Cl. 95—2)

This invention relates to color photography and particularly to packet photographic emulsions.

A photographic mixed packet process is described in Godowsky U. S. Patent 2,698,794. In this process a color forming compound or coupler of the type which reacts with a primary aromatic amino developing agent on photographic development is first dispersed in a peptized silver halide emulsion preferably a gelatino-silver halide emulsion. The emulsion containing the coupler dispersion is then mixed with a water-soluble polymer or water-soluble salt of a polymeric material containing salt-forming acid groups such as the copolymer of methacrylic acid and methyl-α-methacrylate which does not react with the gelatin and to the mixture there is added a solution of a polymeric packet-forming component. The polymeric packet-forming component consists of a polymeric carbon chain having recurring phenyl groups and carboxyl groups and preferably also carboxylic acid amide groups or imide groups or both and is used as the water-soluble salt such as the ammonium, sodium, potassium or lithium salt. The polymeric packet-forming component is preferably an interpolymer of styrene and an α,β-unsaturated carboxylic acid part of whose carboxyl groups may have been converted to amide or imide derivatives or both such as interpolymers of styrene-maleic acid, styrene-acrylic acid, styrene-methacrylic acid or styrene-itaconic acid. There are thus formed particles or packets of gelatin associated with the polymeric packet-forming component, containing silver halide and coupler, the packets being dispersed in an aqueous medium containing additional gelatin or other film-forming water-soluble polymer. The modifying agent, that is, the methacrylic acid-methyl-α-methacrylate polymer may be either in the packet or in the gelatin continuous phase but we believe that at least some of the modifying agent is associated with the packet. Another similarly made packet dispersion containing silver halide sensitive to a different region of the spectrum and a different coupler may be mixed with the first packet dispersion to form a mixed packet emulsion.

As referred to herein a "packet" emulsion is one in which discrete particles or packets of colloidal material contain silver halide emulsion and color coupler and are dispersed in a continuous phase or matrix of water-permeable colloid such as gelatin. Two or more packet emulsions may be mixed and coated in a single matrix or continuous phase to form a mixed packet emulsion.

In the packet emulsions described in Patent 2,698,794 in which a modifying agent such as the sodium salt of the copolymer of methacrylic acid and methyl-α-methacrylate is employed, the emulsion is quite satisfactory in most ways but suffers from the defect that the emulsions tend to have a rather high viscosity and the coatings are somewhat brittle. Furthermore, where it is desired to lower the pH of the emulsion this cannot be done easily because when the pH is lowered, the methacrylic acid-methyl-α-methacrylate copolymer tends to precipitate.

In the drawing,

Fig. 1 is a sectional view of a single-layer film constructed according to our invention, Fig. 2 is a sectional view of a three-layer film having one of the layers constructed according to our invention with the red-sensitive layer outermost, and Fig. 3 is a sectional view of a three-layer film having one of the layers constructed according to our invention, with the blue-sensitive layer outermost.

We have now found that these disadvantages may be overcome by using certain gelatin derivatives in place of the methacrylic acid-methyl-α-methacrylate copolymer as modifying agents in making packet emulsions. These gelatin derivatives are gelatins which have had their active amino or hydroxyl groups or both largely substituted or removed. When packet emulsions are made from such gelatins the final compounds have a lower viscosity than those made from the prior art modifying agents and pH adjustments may be made with no effect on the packets. Packets made by our method allow color separation in mixed packet coatings and have a tendency to be more stable on incubation. Certain of the gelatin derivatives offer the additional advantage of coagulating and redispersing easily upon pH adjustment.

According to our invention the color-forming compound or coupler is first dispersed in a silver halide emulsion such as a gelatino-silver halide emulsion which may be optically sensitized to one of the primary spectral regions in known manner. These couplers are preferably incorporated in the emulsion by dissolving them in a low boiling organic solvent for the coupler with or without a high boiling permanent organic solvent for the coupler and dispersing the solution in gelatin, removing the low boiling organic solvent and adding the dispersion to a gelatino-silver halide emulsion. This method of incorporating couplers is described in Fierke and Chechak U. S. application Serial No. 476,561. The couplers may also be incorporated in the emulsion as described in Jelley and Vittum U. S. Patent 2,322,027.

After making the dispersion of coupler in gelatino-silver halide emulsion the dispersion is added to an aqueous solution of the gelatin derivative which acts as a modifying agent so that small packets containing appropriately sensitized silver halide and coupler can be formed.

To the mixture of dispersion and gelatin derivative there is then added preferably with stirring an aqueous solution of polymeric packet-forming component or gelatin reactant. This packet-forming component is preferably an interpolymer of a styrene, e. g. styrene or an alkyl- or halogen-substituted styrene, and an α,β-unsaturated carboxylic acid part of whose carboxyl groups have been converted to amide or imide derivatives or both, such as the ammonium salt of styrene-maleamic acid copolymer.

In the preparation of these packet emulsions, that is, using the ingredients gelatin, gelatin derivative and packet-forming component the ingredients must be present in a fairly definite ratio. If the gelatin is present in approximately 0.7% aqueous solution (an appropriate concentration for making an emulsion) then the gelatin derivative should be present in an amount from about 1 to 5 times that of the gelatin and the packet-forming component should be present in an amount from 0.01 to 0.5 times that of the gelatin.

Gelatin derivatives which may be used according to our invention include derivatives of the following types:

Deaminated gelatin
Aromatic sulfonyl chloride derivatives of gelatin, e. g.,
    Benzene sulfonyl chloride derivative
    p-Methoxybenzene sulfonyl chloride derivative
    p-Phenoxybenzene sulfonyl chloride derivative
    p-Bromobenzene sulfonyl chloride derivative p-Toluene sulfonyl chloride derivative
m-Nitrobenzene sulfonyl chloride derivative
Carboxylic acid chloride derivatives of gelatin, e. g.,
  Phthalyl chloride derivative
  p-Nitrobenzoyl chloride derivative
  Benzoyl chloride derivative
  Ethyl chlorocarbonate derivative
Carboxylic acid anhydride derivatives of gelatin, e. g.,
  Phthalic anhydride derivative
  Benzoic anhydride derivative
  Succinic anhydride derivative
  Maleic anhydride derivative
Aromatic isocyanate derivatives of gelatin, e. g.,
  Phenyl isocyanate derivative
  p-Bromophenyl isocyanate derivative
  p-Chlorophenyl isocyanate derivative
  p-Tolyl isocyanate derivative
  p-Nitrophenyl isocyanate derivative
1,4-diketone derivatives of gelatin, e. g.,
  Acetonyl acetone derivative
  Dimethyl acetonyl acetone derivative
  Diethyl diacetyl succinate derivative
Ethylated gelatin derivatives, the preparation of which is described below.
Cyanoethylated gelatin
Cyanoethylated phthalyl gelatin
Cyanoethylated deaminated gelatin Deaminated gelatin is gelatin a portion of whose amino groups have been removed and the viscosity thereby lowered. This material is described in Sheppard and Hudson British Patent 628,757. A preferred type of carboxylic acid anhydride derivative of gelatin is phthalyl gelatin which is gelatin prepared by heating an aqueous dispersion of gelatin with a solution of phthalic anhydride at an alkaline pH. This material is described in Yutzy and Frame U. S. Patent 2,525,753. A further derivative of this is ethylated phthalyl gelatin which is a phthalyl gelatin which has been treated with ethyl sulfate at a pH of 9 to 10. An example of this treatment is given below.

The sulfonyl chloride, carboxylic acid chloride, carboxylic acid anhydride, isocyanate and diketone derivatives of gelatin are described in Yutzy and Frame U. S. Patent 2,614,928.

Cyanoethylated gelatin is gelatin containing cyanoethyl groups produced by reacting a solution of a gelatin with acrylonitrile. Cyanoethylated phthalyl gelatin is produced by treating gelatin with phthalic anhydride and then with acrylonitrile. These materials are described in Gates and Lowe British Patent 648,926. Cyanoethylated deaminated gelatin is produced by treating the deaminated gelatin of British Patent 628,757 with acrylonitrile as described in British Patent 648,926.

ETHYLATED GELATIN

To a stirred solution of 400 g. of gelatin dispersed in 2266 cc. of water at 120° F. and adjusted to pH 9.5, 120 g. of ethyl sulfate was added. The pH was maintained constant by the addition of 20% sodium hydroxide over a period of 2½ hours. At the end of this reaction time the pH was adjusted to 6.0 with 6 N sulfamic acid and the gelatin solution was chilled, noodled, washed 6 hours and dried, in a manner consistent with gelatin handling.

ETHYLATED PHTHALYL GELATIN

To a stirred solution of 1500 g. of gelatin in 12 liters of water at 110° F. and adjusted to pH 9.5, 375 g. of phthalic anhydride dissolved in acetone was added dropwise. The pH was maintained constant by the addition of 20% sodium hydroxide during the reaction time. At the end of this period 450 g. of ethyl sulfate was added to the stirred and treated solution and the pH was again maintained at 9.5 with 20% sodium hydroxide solution. The ethylation occurred over a period of 2 hours; at the end of this reaction the pH was adjusted to neutral, and the gelatin solution was chilled, noodled, washed and dried in a manner consistent with gelatin handling.

The following couplers are suitable for use according to our invention, as well as the couplers described in Godowsky U. S. Patent 2,698,794.

(1) 1 - hydroxy-2-[δ-(2',4'-di-tert. amylphenoxy)-n-butyl]-naphthamide (U. S. Patent 2,474,293)
(2) 1 - hydroxy-4-phenylazo - 4'- (p-tert.-butylphenoxy)-2-naphthanilide (U. S. Patent 2,521,908)
(3) 2-(2,4-di-tert. amylphenoxyacetamino)-4,6-dichloro-5-methyl phenol (Graham U. S. application Serial No. 285,544)
(4) 2-(α-di-tert. amylphenoxy-n-butyrylamino)-4,6-dichloro-5-methyl phenol
(5) 6-{α-{4-[α-(2,4-di-tert. amylphenoxy)butyramido]phenoxy}-acetamido}-2,4-dichloro-3-methyl phenol
(6) 2-[3'-(2'',4''-diamylphenoxy)-acetamido]-benzamido-4-chloro-5-methyl phenol
(7) 1-(2',4',6'-trichlorophenyl)-3-[3''-(2''',4'''-di-tert. amylphenoxyacetamido)-benzamido] - 5 - pyrazolone (U. S. Patent 2,600,788)
(8) 1-(2',4',6'-trichlorophenyl)-3-[3''-(2''',4'''- di-tert. amyl phenoxy - acetamido)-benzamido]-4-(p-methoxyphenyl-azo)-5-pyrazolone
(9) N - (4-benzoylacetaminobenzenesulfonyl)-N-(γ-phenylpropyl)-p-toluidine (U. S. Patent 2,298,443)
(10) α-o-methoxybenzoyl-α-chloro-4-[α-(2,4-di-tert. amylphenoxy)-n-butyramido]-acetanilide (McCrossen U. S. application Serial No. 295,806)
(11) α-{3-[α-(2,4-di-tert. amylphenoxy)acetamido]-benzoyl}-2-methoxy-acetanilide
(12) 3-benzoylacetamino-4-methoxy-2',4'-di-tert. amylphenoxyacetanilide
(13) 4-benzoylacetamido-3-methoxy-2',4'-di-tert. amylphenoxyacetanilide The preparation of couplers 4, 5, 6, 8, 11, 12 and 13 is described in Fierke and Chechak U. S. application Serial No. 476,561, filed concurrently herewith.

Suitable polymers of styrene with maleic acid or its derivatives which may be used as the packet-forming component in our process are represented by the following formula:

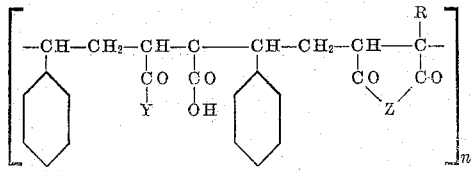

Suitable polymers of styrene with acrylic acid or its derivatives may be represented by the following formula:

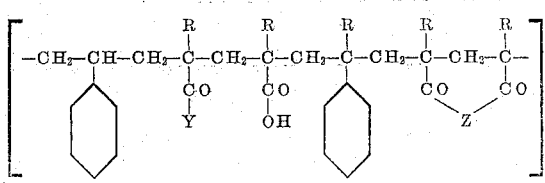

In each formula $Y$ = OH, $NH_2$, NHR', $NR'_2$.
$R$ = hydrogen, $CH_3$, $C_2H_5$.
$R'$ = alkyl of less than six carbon atoms or aryl.
$Z$ = NH, NR', OH groups on each carbon atom to which Z is attached.
$n$ = the number of units in the polymer chain.

It will be understood that the above structural formulas are illustrative only, and are not limiting as to ratios and unit arrangements of constituents.

The polymeric packet-forming components of the first structural formula above may be prepared by forming an interpolymer of styrene and maleic anhydride, and then treating the polymer with ammonia, a primary or secondary amine, or water, as indicated by the following formula using ammonia:

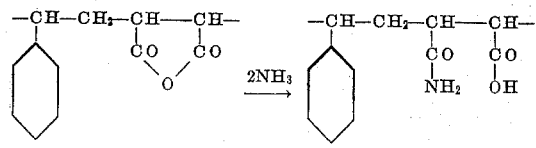

Formation of these polymers is described in Condo, Krister and Lundquist U. S. Patent 2,286,062 and McDowell and Kenyon U. S. Patent 2,313,565.

Interpolymers of styrene and acrylic anhydride or α-methacrylic anhydride may be used instead of the interpolymer of styrene and maleic anhydride, as indicated by the following formula using ammonia:

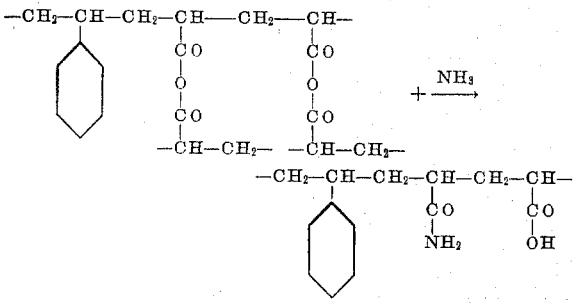

Inside groups along the polymer chain may result from the interaction of adjacent amide groups or an amide and a carboxyl group.

These polymers may also be prepared by direct polymerization, e. g., styrene, acrylamide or N-substituted acrylamide, acrylic acid; or styrene, maleamic acid or N-substituted maleamic acid. The preparation of these polymers is fully described in Patent 2,698,794.

Our invention will now be described by reference to the accompanying drawing in which two forms of the invention are illustrated.

As shown in Figure 1 a support 10 of cellulose triacetate, cellulose acetate propionate, glass or paper is coated with an emulsion layer which consists of a continuous phase 11 of gelatin containing the gelatin derivative such as cyanoethylated gelatin and dispersed therein, packets 12 of gelatin, styrene-maleamic acid resin, silver halide and color former.

Figure 2 illustrates a multilayer photographic element in which the support 10 is coated with a high speed blue-sensitive gelatino-silver halide emulsion layer 13 containing a dispersion of a yellow color former and on layer 13 a layer 14 containing a gelatin and gelatin derivative continuous phase and having dispersed therein packets or particles 15 of gelatin, styrene-maleamic acid resin, slower green-sensitive silver halide and magenta color former. On this layer there is coated a slower red-sensitive gelatino-silver halide emulsion layer 17 containing a dispersion of a cyan color former.

Fig. 3 illustrates a multilayer photographic element in which the support 10 is coated first with the red-sensitive gelatino-silver halide emulsion 17 containing a dispersion of cyan color former, then with the emulsion 14 containing packets 15 of gelatin, styrene-maleamic acid resin, green-sensitive silver halide and magenta color former. On layer 14 there is coated a filter layer 16 of colloidal silver or other blue-light-absorbing material, to prevent blue light from reaching layers 13 and 14. A blue-sensitive gelatino-silver halide emulsion 13 containing a dispersion of yellow color former, except for the final protective overcoating layer (not shown) which may be used if desired.

Although we have shown the layers 11 and 14 as containing the gelatin derivative, that is, the cyanoethylated gelatin or other gelatin derivative, in the continuous phase of gelatin, it will be understood that part of the gelatin derivative may be associated with the packets 12 and 15.

The following examples illustrate the preparation of coupler dispersions according to our invention.

*Example 1*

A coupler dispersion was made by dissolving 132 g. of the magenta coupler 1-(2',4',6'-trichlorophenyl)-3-[3''-(2''',4'''-di-tert.-amylphenoxyacetamido)-benzamido]-5-pyrazolone and 13.2 g. of di-iso-octyl hydroquinone in 384 cc. of di-n-butyl phthalate, and dispersing the solution in a mixture of 780 cc. of 10% gelatin solution and 132 cc. of 10% Alkanol B solution. The dispersion was run through a colloid mill 5 times, and then brought to a final weight of 1500 g. by adding water.

A gelatino-silver chlorobromide emulsion containing the equivalent of 108 g. of silver and 160 g. of gelatin was green-sensitized in known manner, and was mixed with 2460 g. of the coupler dispersion and 1600 cc. of a 15% solution of cyanoethylated gelatin prepared according to Example 3 of British Patent 648,926, and the mixture was stirred at 40° C. Five minutes later a homogeneous mixture of 2000 g. of a 2½% solution of the ammonium salt of styrene-maleamic acid polymer and 2000 g. of a 15% solution of cyanoethylated gelatin were added. Stirring was continued, and after 15 minutes 600 cc. of a 10% solution of calcium acetate (monohydrate) were added. Packets formed which were about 3 to 9 mμ in diameter and were well dispersed.

In a similar manner packets were formed in a red-sensitive gelatino-silver chlorobromide emulsion using the cyan coupler 1-hydroxy-2-[δ-(2',4'-di-tert.amylphenoxy)-n-butyl]naphthamide.

The packet emulsions were then mixed and coated to form a single layer, mixed packet coating.

Cyanoethylated gelatin may be used in place of the gelatin in the coupler dispersion. In this case no additional cyanoethylated gelatin need be added during the formation of the packets.

*Example 2*

A photographic paper support was coated with emulsion layers containing yellow, magenta and cyan couplers as follows:

A yellow coupler dispersion was made by dissolving 20.1 g. of N-(4-benzoylacetamino benzene sulfonyl)-N-(γ-phenylpropyl)-p-toluidine in 20.1 cc. of di-n-butylphthalate and dispersing the solution in a mixture of 102 cc. of 10% gelatin solution and 14.7 cc. of 5% Alkanol B solution in 77 cc. of water. The mixture was stirred for 5 minutes in a rapid mixing stirrer.

A blue-sensitive emulsion containing the yellow coupler was made by mixing 156 g. of the yellow coupler dispersion with 552 g. of a gelatino-silver chlorobromide emulsion containing 2 mole percent chloride and 98 mole percent bromide, 54 g. of 10% gelatin solution and 942 cc. of water. The mixture was well stirred at 40° C., necessary coating addenda added, and then coated on a photographic paper support.

A green-sensitive emulsion was made by stirring at 40° C. 298.5 g. (containing 0.1 mole AgX) of gelatino-silver chlorobromide emulsion containing 80 mole percent chloride and 20 mole percent bromide, and adding to it a solution of 13.2 mg. of 5-[(ethyl-2(3)-γ-naphthoxazolydine)ethylidene]-3-n-heptyl-1-phenyl-2-thiohydantoin in 20 cc. of acetone. The mixture was stirred 15 minutes at 40° C., and 2.64 cc. of 10% potassium bromide was added and stirred in completely.

To this green-sensitive emulsion there were added 246 g. of the magenta coupler dispersion of Example 1. The mixture was stirred until homogeneous. Stirring was continued and a homogeneous mixture of 176 cc. of a 2½ percent solution of the ammonium salt of styrene-maleamic acid copolymer and 264 cc. of a 15 percent solution of cyanoethylated gel, prepared according to Example 3 of British Patent 648,926, was added. Fifteen minutes later 60 cc. of 10 percent calcium acetate monohydrate were added. For coating, 229 g. of this packet dispersion, 80 g. of 10% gelatin solution, 40.5 cc. of water and the necessary coating addenda were mixed and stirred at 40° C., and coated directly over the emulsion containing the yellow coupler.

A cyan coupler dispersion was made by dissolving 13.4 g. of 2-(diamylphenoxy acetamino)-4,6-dichloro-5-methyl phenol and 0.16 g. of di-iso-octyl hydroquinone in 41.4 cc. of di-n-butylphthalate and dispersing the solution in 120 cc. of 10% gelatin solution, 16.2 cc. of 5% Alkanol B solution in 109 cc. of water. The mixture was stirred for 5 minutes in a rapid mixing stirrer.

A red-sensitive emulsion was made by stirring 59.7 g. of a gelatino-silver chlorobromide emulsion containing 80 mole percent chloride and 20 mole percent bromide, in 24.4 cc. of water at 40° C. and adding to it a solution of 0.88 mg. of 5-[4-(3-ethyl-2(3)-benzothiazolylidine)2-butenylidene]-3-n-heptyl-1-phenyl-2-thiohydantoin in 1.76 cc. of acetone. The resulting mixture was stirred 15 minutes at 40° C. and then there were added to it 51 g. of 10% gelatin solution, 30 g. of the cyan coupler dispersion and 132 cc. of water, along with the necessary coating addenda. This mixture was stirred at 40° C. and coated over the magenta coupler layer.

A gelatin overcoating layer was finally applied.

Upon exposure and development of this layer in the following developer satisfactory color separation was obtained.

| | G. |
|---|---|
| 2-amino-5-diethylamino toluene HCl | 2 |
| Sodium sulfite (desiccated) | 2 |
| Sodium carbonate (anhydrous) | 20 |
| Potassium bromide | 2 |
| Water to 1 liter. | |

Example 1 above describes forming a single-layer, two-color mixed packet coating. A three-color system can be formed similarly by mixing a third packet emulsion with the other two, or the third color can be formed in a separate emulsion layer coated over or under the mixed packet layer, and the third layer may itself be a packet emulsion and may or may not contain color formers.

Example 2 describes a multi-layer coating in which one of the layers is formed from a packet emulsion. The packet layer is coated between the other layers to keep color contamination to a minimum. In a similar manner two or three of the layers may be formed from packet emulsions, and these may be coated in any desired sensitivity order, that is, with the blue-sensitive, green-sensitive or red-sensitive layer nearest the support.

What we claim is:

1. A light-sensitive packet photographic emulsion comprising packets or discrete particles of gelatin reacted with a water-soluble salt of an interpolymer of a styrene and an $\alpha,\beta$-unsaturated carboxylic acid, said particles or packets containing a non-diffusing color-forming compound capable of reacting with the oxidation product of a primary aromatic amino developing agent on photographic development and silver halide, the sensitive and color-forming ingredients being within the packets or discrete particles and said packets or discrete particles being dispersed in gelatin having mixed therewith a gelatin derivative selected from the class consisting of deaminated gelatin, aromatic sulfonyl chloride derivatives of gelatin, carboxylic acid chloride derivatives of gelatin, carboxylic acid anhydride derivatives of gelatin, aromatic isocyanate derivatives of gelatin, 1,4-diketone derivatives of gelatin, ethylated gelatin, cyanoethylated gelatin, cyanoethylated phthalyl gelatin and cyanoethylated deaminated gelatin.

2. A light-sensitive mixed packet photographic emulsion comprising packets or discrete particles of gelatin reacted with the ammonium salt of a styrene-maleamic acid polymer, said particles or packets containing a non-diffusing color-forming compound capable of reacting with the oxidation product of a primary aromatic amino developing agent on photographic development, and silver halide sensitive to at least one region but less than all regions of the visible spectrum and at least one separate set of packets or discrete particles of gelatin reacted with said polymer, containing a non-diffusing color-forming compound different from said first-mentioned color-forming compound and silver halide sensitive to a region of the visible spectrum different from that to which said first-mentioned silver halide is sensitive, the sensitive and color-forming ingredients being within the respective packets or discrete particles and all of said packets being dispersed in gelatin having mixed therewith a gelatin derivative selected from the class consisting of deaminated gelatin, aromatic sulfonyl chloride derivatives of gelatin, carboxylic acid chloride derivatives of gelatin, carboxylic acid anhydride derivatives of gelatin, aromatic isocyanate derivatives of gelatin, 1,4-diketone derivatives of gelatin, ethylated gelatin, cyanoethylated gelatin, cyanoethylated phthalyl gelatin and cyanoethylated deaminated gelatin.

3. The mixed packet photographic emulsion of claim 2 in which the gelatin derivative is phthalic anhydride gelatin derivative.

4. The mixed packet photographic emulsion of claim 2 in which the gelatin derivative is ethylated gelatin derivative.

5. The mixed packet photographic emulsion of claim 2 in which the gelatin derivative is ethylated phthalyl gelatin.

6. The mixed packet photographic emulsion of claim 2 in which the gelatin derivative is cyanoethylated gelatin.

7. The method of making a mixed packet photographic emulsion which comprises dispersing in a gelatino-silver halide emulsion sensitive to at least one but less than all regions of the visible spectrum, a non-diffusing color-forming compound capable of reacting with the oxidation product of a primary aromatic amino developing agent on photographic development to form a dispersion of the color-forming compound in the emulsion, mixing said dispersion with at least one part per part of gelatin in said emulsion of a gelatin derivative selected from the class consisting of deaminated gelatin, aromatic sulfonyl chloride derivatives of gelatin, carboxylic acid chloride derivatives of gelatin, carboxylic acid anhydride derivatives of gelatin, aromatic isocyanate derivatives of gelatin, 1,4-diketone derivatives of gelatin, ethylated gelatin, cyanoethylated gelatin, cyanoethylated phthalyl gelatin and cyanoethylated deaminated gelatin, adding to the mixture of dispersion and gelatin derivative slowly and with stirring a solution of a water-soluble salt of an interpolymer of styrene, said interpolymer containing at least a group selected from the class consisting of carboxylic acid and carboxylic acid amide groups to form a dispersion of particles of gelatin, water-soluble salt of styrene interpolymer and silver halide containing the color-forming compound, forming in the same way as said last-mentioned dispersion at least one other dispersion of particles of gelatin, water-soluble salt of styrene interpolymer, different non-diffusing color-forming compound and silver halide sensitive to a region of the visible spectrum different from that to which said first-mentioned silver halide is sensitive, in each of said dispersions said gelatin derivative being used in an amount at least as great as the amount of gelatin, and said water-soluble salt of styrene interpolymer being used in an amount less than about one-half the amount of gelatin, and mixing said dispersions of particles with a gelatin solution.

8. The method of making a mixed packet photographic emulsion which comprises mixing a non-diffusing color-forming compound capable of reacting with the oxidation product of a primary aromatic amino developing agent on photographic development, with a substantially water-insoluble solvent for said color-forming compound to form a solution of the color-forming compound in the solvent, dispersing the solution in a gelatino-silver halide emulsion sensitive to at least one but less than all regions of the visible spectrum, mixing said dispersion with at least one part per part of gelatin in said emulsion, of cyanoethylated gelatin, adding to the mixture of dispersion and polymer slowly and with stirring a solution of a water-soluble salt of an interpolymer of styrene, said interpolymer containing at least a group selected from the class consisting of carboxylic acid and carboxylic acid amide groups to form a dispersion of particles of gelatin, water-soluble salt of styrene interpolymer and silver halide containing the color-forming compound, forming in the same way as said last-mentioned dispersion at least one other dispersion of particles of gelatin, water-soluble salt of styrene interpolymer, different non-diffusing color-forming compound and silver halide sensitive to a region of the visible spectrum different from that to which said first-mentioned silver halide is sensitive, in each of said dispersions said cyanoethylated gelatin being used in an amount at least as great as the amount of gelatin, and said water-soluble salt of styrene interpolymer being used in an amount less than about one-half the amount of gelatin, and mixing said dispersions of particles with a gelatin solution.

9. The method of claim 8 in which phthalic anhydride gelatin derivative is used instead of cyanoethylated gelatin.

10. The method of claim 8 in which ethylated gelatin derivative is used instead of cyanoethylated gelatin.

11. The method of claim 8 in which ethylated phthalyl gelatin is used instead of cyanoethylated gelatin.

12. A photographic mixed packet dispersion, the continuous phase comprising an aqueous colloidal binder and the disperse phase comprising at least two differently light-sensitive sets of packets or discrete particles, each packet of any one set itself containing dispersed therein silver halide grains sensitized to one of the primary regions of the visible spectrum and also containing dispersed therein a non-diffusing color-forming compound capable of reacting with the oxidation product of a primary aromatic amino developing agent on photographic development, the particles of any one set comprising cyanoethylated gelatin reacted with a water-soluble salt of a styrene interpolymer containing carboxylic acid groups, and containing a silver halide dispersion, the styrene interpolymer-gelatin combination which forms the continuous phase of the packets being immiscible with said aqueous colloidal binder.

References Cited in the file of this patent

UNITED STATES PATENTS

| | | |
|---|---|---|
| 2,284,877 | Martinez | June 2, 1942 |
| 2,698,794 | Godowsky | Jan. 4, 1955 |